(12) United States Patent
Al-Hasan

(10) Patent No.: US 8,262,108 B2
(45) Date of Patent: Sep. 11, 2012

(54) STABLE STAND OR CART FOR A GAS CYLINDER

(76) Inventor: Khaled Jafar Al-Hasan, Al Zahra (KW)

(\*) Notice: Subject to any disclaimer, the term of this patent is extended or adjusted under 35 U.S.C. 154(b) by 52 days.

(21) Appl. No.: 12/907,176

(22) Filed: Oct. 19, 2010

(65) Prior Publication Data

US 2012/0091675 A1 Apr. 19, 2012

(51) Int. Cl.
*B62B 3/04* (2006.01)
(52) U.S. Cl. .................. 280/47.371; 280/47.34
(58) Field of Classification Search ............... 280/43.1,
280/43.11, 43.12, 47.131, 47.27, 47.26, 47.34,
280/47.35, 47.17, 47.19, 47.2, 47.24, 47.315,
280/47.371, 79.3, 79.5, 79.6, 79.7, 35, 638,
280/651, DIG. 6; 414/448, 444, 449, 490,
414/23; 254/209; 294/31.2; 224/42.39,
224/407; 137/355.16
See application file for complete search history.

(56) References Cited

U.S. PATENT DOCUMENTS

| | | | | |
|---|---|---|---|---|
| 1,408,400 A * | 2/1922 | Richards | ............... | 280/47.19 |
| 1,432,037 A * | 10/1922 | Russell | ............... | 280/47.19 |
| 2,654,493 A * | 10/1953 | Kernkamp | ............... | 414/448 |
| 2,778,515 A * | 1/1957 | Hanson | ............... | 414/448 |
| 3,865,392 A * | 2/1975 | Hartway | ............... | 280/35 |
| 3,998,476 A * | 12/1976 | Kazmark, Sr. | ............... | 280/655 |
| D246,774 S * | 12/1977 | Esposito | ............... | D34/26 |
| 4,205,937 A | 6/1980 | Fawley | | |
| 4,753,445 A | 6/1988 | Ferrare | | |
| 4,896,897 A * | 1/1990 | Wilhelm | ............... | 280/655 |
| 5,026,089 A * | 6/1991 | Grimmonpre | ............... | 280/655 |
| 5,367,743 A * | 11/1994 | Chang | ............... | 16/113.1 |
| 5,419,569 A * | 5/1995 | Walla | ............... | 280/47.27 |
| 5,441,297 A * | 8/1995 | Krohn et al. | ............... | 280/655 |
| 5,549,318 A * | 8/1996 | Ho | ............... | 280/654 |
| 5,658,118 A * | 8/1997 | Luca | ............... | 414/444 |
| 5,779,252 A * | 7/1998 | Bolton, Jr. | ............... | 280/47.371 |
| 5,810,697 A * | 9/1998 | Joiner | ............... | 482/68 |
| 5,947,351 A * | 9/1999 | Garofalo et al. | ............... | 224/153 |
| 6,047,983 A * | 4/2000 | Day, III | ............... | 280/652 |
| 6,099,024 A * | 8/2000 | Liao | ............... | 280/655 |
| 6,116,623 A | 9/2000 | Salvucci | | |
| 6,334,622 B1 | 1/2002 | Romero | | |
| 6,554,300 B1 * | 4/2003 | Ziolkowski | ............... | 280/47.27 |
| 6,682,084 B2 * | 1/2004 | Webster et al. | ............... | 280/79.5 |
| 6,705,621 B1 * | 3/2004 | Drayer | ............... | 280/30 |
| 6,715,785 B2 * | 4/2004 | Shieh | ............... | 280/651 |
| 6,799,769 B2 * | 10/2004 | Ziolkowski | ............... | 280/47.27 |
| 6,883,824 B2 * | 4/2005 | Yang | ............... | 280/646 |
| 7,273,216 B1 * | 9/2007 | Hohrman | ............... | 280/79.5 |
| 7,416,195 B2 * | 8/2008 | Zwack | ............... | 280/47.24 |

(Continued)

*Primary Examiner* — J. Allen Shriver, II
*Assistant Examiner* — Brodie Follman
(74) *Attorney, Agent, or Firm* — Lowe Hauptman Ham & Berner, LLP

(57) ABSTRACT

A stable stand or cart for one or more gas cylinders includes a T-shaped base assembly having a forwardly extending base member and a lower rear cross member with three casters fixed to a lower surface thereof. An upwardly extending frame includes two upwardly extending telescoping tubes and an upper cross member fixed to the tubes. An upper and a lower C-shaped support member are fixed to the upwardly extending frame and a clamp is provided to fix the distance between the C-shaped support members. The stand or cart also includes a first flexible belt, four guide members, and a central positioning member for positioning the central positioning member for different size gas cylinders. A second flexible belt extends from the central positioning member around the gas cylinder or cylinders to hold the cylinder or cylinders to the stand or cart.

8 Claims, 4 Drawing Sheets

U.S. PATENT DOCUMENTS

| | | |
|---|---|---|
| 7,628,407 B1 | 12/2009 | Krowl |
| 7,740,251 B2 * | 6/2010 | Simmons ................... 280/47.27 |
| 7,824,144 B2 * | 11/2010 | Wilson .......................... 414/421 |
| 7,942,429 B2 * | 5/2011 | Hill ............................ 280/47.26 |
| 2003/0071428 A1 * | 4/2003 | Kang ............................. 280/62 |
| 2003/0141685 A1 * | 7/2003 | Ziolkowski ................ 280/47.24 |
| 2005/0212266 A1 * | 9/2005 | Lu ................................ 280/651 |
| 2006/0071435 A1 * | 4/2006 | Zwack ....................... 280/47.27 |
| 2006/0091628 A1 * | 5/2006 | Cheslak ..................... 280/47.27 |
| 2006/0196548 A1 * | 9/2006 | Trettin et al. ............ 137/355.16 |
| 2007/0096412 A1 * | 5/2007 | Sharp ......................... 280/47.24 |
| 2007/0114739 A1 * | 5/2007 | Simmons ................... 280/47.27 |
| 2009/0285659 A1 * | 11/2009 | Wilson .......................... 414/444 |
| 2010/0096821 A1 * | 4/2010 | Hill ............................ 280/47.26 |
| 2010/0327562 A1 * | 12/2010 | Kasuya et al. ................ 280/651 |

\* cited by examiner

STABLE STAND OR CART FOR A GAS CYLINDER

FIELD OF THE INVENTION

This invention relates to a stable stand or cart for a gas cylinder or the like and more particularly to a stand or cart for a gas cylinder having a metal frame and flexible belt for accommodating gas cylinders of different sizes.

BACKGROUND FOR THE INVENTION

Stands or carts for gas cylinders are well known and have been in use for many years. For example, a U.S. Pat. No. 1,408,400 of Richards discloses a truck or cart for gas tanks such as acetylene for welding and cutting. As disclosed the truck or cart is adapted for carrying two gas tanks that occupy a minimum floor space while the tanks are held in place by chains.

A more recent approach to a carrier for compressed gas cylinders is disclosed in a U.S. Pat. No. 4,205,937 of Fawley. The Fawley patent discloses a carrier for one or more compressed gas cylinders, each having a portion, of the underside of which is arranged to receive a supporting hook, the carrier having a frame approximating the height of the cylinder and including a hook near its upper end. The frame is tiltable in one direction with respect to the cylinder for insertion of the hook under a hook receiving portion. The side of the frame opposite from the cylinder includes carrier wheels whereby upon tilting of the frame in the opposite direction the hook is raised to support the cylinder in contact with the frame. The frame is provided with a safety bale or retainer loop moveable over the cylinder and engageable therewith to provide a second retainer for the cylinder. One embodiment has tilt aiding wheels at the bottom of the frame to provide rolling support for the frame on movement of the frame into position for engagement of the hook receiving portion that cooperates with the carrier wheels to effect rolling support for the cylinder as well as low distribution and balance.

A further approach to a cylinder transport is described in a Luca U.S. Pat. No. 5,658,118. As disclosed a transporter for elongated compressed air cylinders comprises an elongated load bearing beam supported in an upright inclined position by a pair of rotatable attached wheels and a supplemental support, the support also mounting a wheel which pivots about a vertical axis to facilitate a steering function. The transporter further having a hook device for engaging a hook receiving aperture on a compressed gas cylinder, the hook device moveably attached to the beam via a device for elevating and lowering the hook relative to the beam. Handle devices attached to the transporter provide for manual actuation of the elevating and lowering device as well as for tilting motion and movement of the transporter. The beam having a cylinder support unit fixedly attached for receiving a compressed gas cylinder carried by the transporter. The yolk has a strap connectedly mounted which encircles and secures a compressed gas cylinder. The beam further has an end rail that cooperates with the rear pair to stably support the transporter in a substantially vertical position and provide mobility thereto.

A still further advance in the art is disclosed in a U.S. Pat. No. 6,554,300 for a Welding Cylinder Dolly of Ziolkowski. As disclosed therein, a wheel hand dolly for loading, unloading and transporting cylindrical objects from one location to another includes a pair of vertical support members cooperating to form a forwardly facing contact area and joined by a cross-member having a recessed portion. An adjustable restraining strap includes a free end with an attachment member and an opposing anchor end for attachment to either side of the cross-member to substantially encircle the cylindrical object and having a second contact area to sandwich the cylindrical object between the contact surfaces and fixedly retain it thereto so that the object may be transported along with the dolly.

Notwithstanding the above, it is presently believed that there is a need and a potential commercial market for an improved stable stand or cart for gas cylinders such as cylinders for compressed gas including oxygen, hydrogen, nitrogen, argon, acetylene, etc. There should be a need for a stand or cart according to the present invention because such stands and/or carts are stable, easy to move about and position for use, durable, and can be manufactured and sold at a competitive price. Further, the stable stands and/or carts in accordance with the present invention may be readily adjusted to handle gas cylinders of different sizes and at the same time position a strap and supports for anchoring the gas cylinder to a stable platform that is relatively light weight and of durable construction.

BRIEF SUMMARY OF THE INVENTION

In essence, the present invention contemplates a stable storage stand or transfer carrier comprising or consisting of a T-shaped base assembly. The T-shaped base assembly is preferably made of steel, but could be made of aluminum, includes a forwardly extending base member and a lower rear cross-member that completes the T-shape. The cross-member is fixed to the forwardly extending base member at the top thereof as for example by welding.

The T-shaped base assembly also has three outer portions with one outer portion at the free end of the forwardly extending base member and one at each outer end of the cross-member.

The T-shaped base assembly also includes three swivable casters with one of said casters fixed to an underside of each outer portion or end.

The stand or cart also includes an upwardly extending frame that includes a pair of upwardly extending spaced apart generally parallel telescoping tubes fixed to said lower rear cross-member of the T-shaped base as for example by welding and an upper cross frame member fixed to an upper portion of the upwardly extending telescoping tubes.

In a preferred embodiment of the invention the upper cross frame member extends outwardly slightly beyond the pair of upwardly extending spaced apart generally parallel telescoping tubes. The upper cross frame member is generally parallel with the lower rear cross member and includes two outwardly extending portions beyond the upwardly extending tubes.

In addition to the above, the storage stand or transfer cart also includes an upper C-shaped support member and a lower C-shaped support member for supporting the sides and back of one or two gas cylinders. The upper C-shaped support member is fixed to an upper part of the upwardly extending frame or to an upper part of the upwardly extending telescoping tubes while the lower C-shaped support member is fixed to a lower part of the upwardly extending frame namely to a lower part of the telescoping tubes.

The stand or cart in accordance with the present invention also includes means such as a knob and threaded stud threaded in one of the upwardly extending telescoping tubes for clamping an outer tube and an inner tube together at a pre-selected spaced apart distance that positions the upper and lower C-shaped members. An extension element such as a tubular extension, preferably a tubular extension with a rectangular cross section, extending upwardly above the upper C-shaped support member and is fixed to an upwardly extending frame and may include a handle fixed to a distal end thereof. The upwardly extending extension element also includes means as for example a hinge assembly that allows the extension to be folded over upon itself.

Finally, the stand or cart includes a flexible belt and four guide members with one of the guide members at the outer extension of the upper cross-member and one guide member at each outer portion of the lower rear cross-member. A central positioning member is also included and a first flexible belt connecting the first guide member and central positioning member together. A second flexible belt extends forwardly from the central positioning member around one or two gas cylinders and back to the central positioning member and is fixed thereto for anchoring the gas cylinder or cylinders in place.

The invention will now be described in connection with the accompanying drawings wherein like reference numerals have been used to indicate like parts.

DESCRIPTION OF THE PREFERRED EMBODIMENTS OF THE INVENTION

Figure 1:
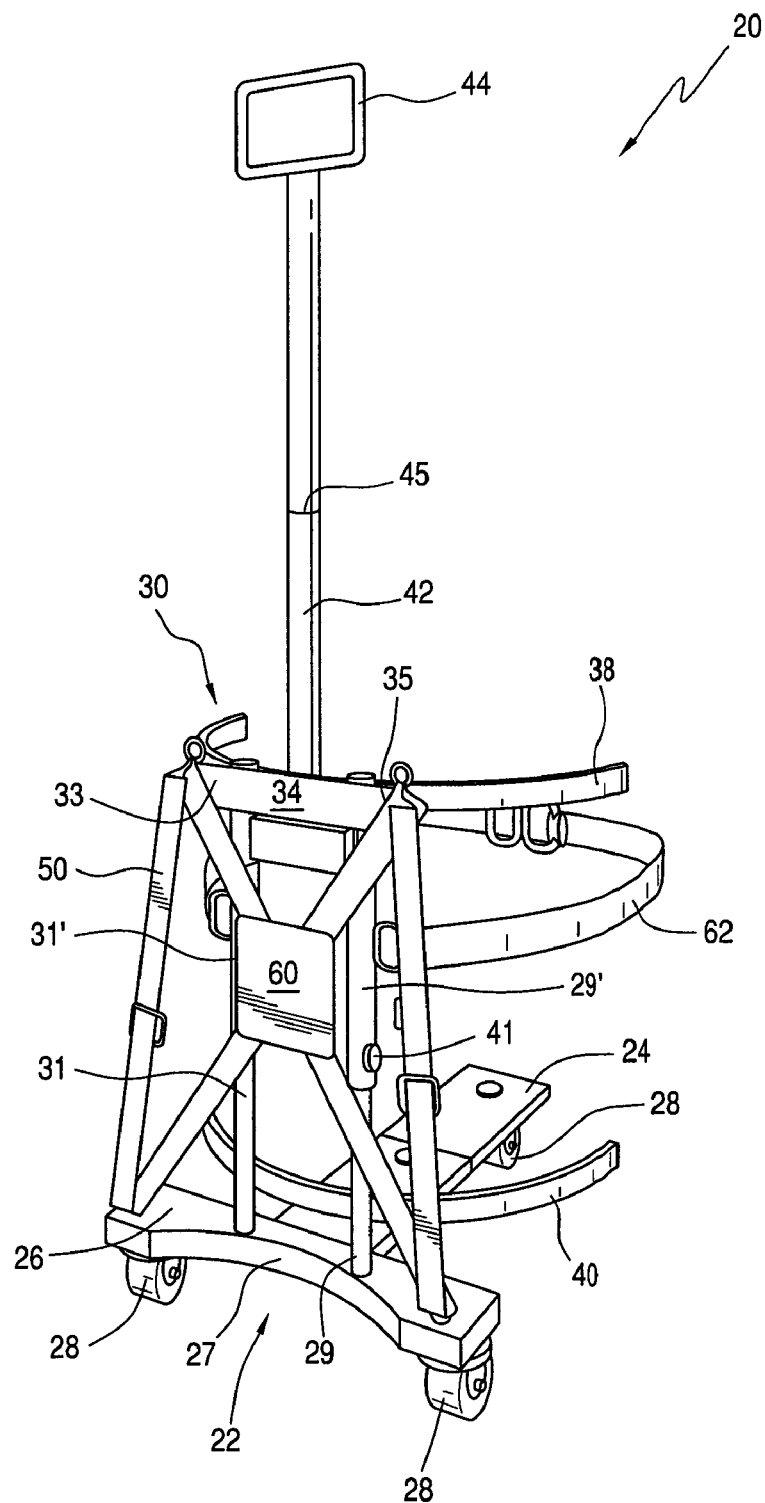
FIG. 1 is a perspective view of a stable stand or cart in accordance with the present invention taken from the rear thereof.
Figure 2:
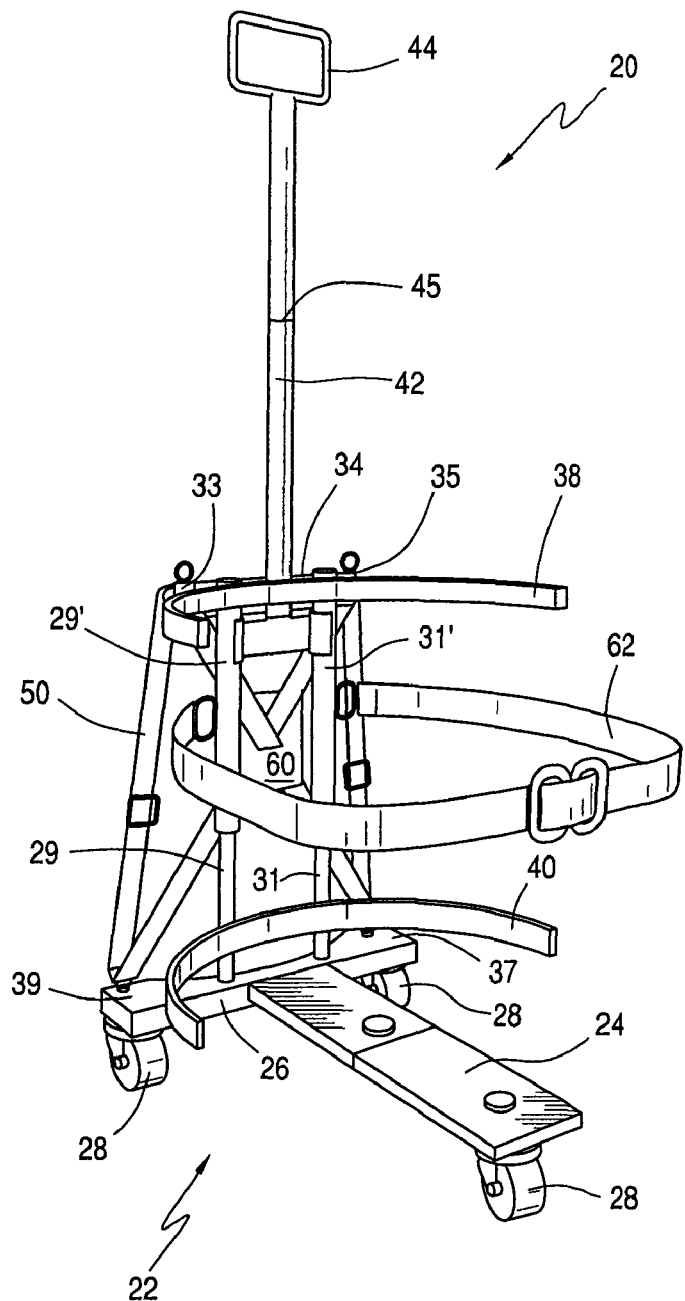
FIG. 2 is a perspective view of the stand or cart shown in FIG. 1 but taken from the front of the stand or cart.
Figure 3:
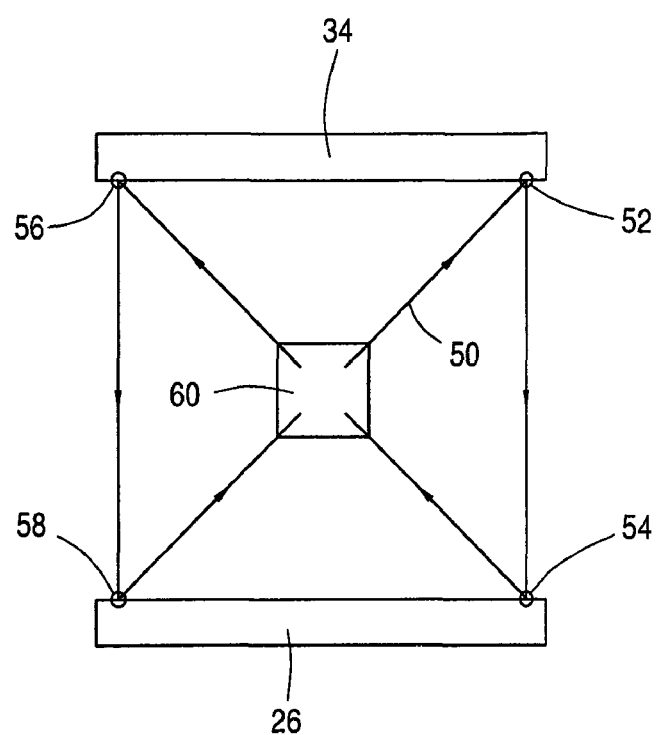
FIG. 3 is a schematic illustration of the path of a belt as used in the present invention.

As illustrated in FIGS. 1 and 2, a stable stand or cart 20 for one or two gas cylinders such as oxygen, hydrogen, nitrogen, argon, acetylene or the like includes a T-shaped base assembly 22. The T-shaped base assembly 22 is preferably made of steel or aluminum and includes a forwardly extending base member 24 that defines a generally flattened rectangular cross-section with a flat upper surface. The forwardly extending base member 24 may be made of two telescopic parts with a detant to hold them together in a first position while allowing them to be forced together for storage.

The T-shaped base assembly 22 also includes a lower rear cross-member 26 that is at the top of the "T" and defines a concaved arc shaped surface 27 on the rear or outer edge of the cross-member 26. Three casters 28 are disposed on a lower surface of the outer extremes of the T-shaped base assembly.

An upwardly extending steel frame 30 includes a pair of upwardly extending telescoping parallel tubular members 29 and 31 that are fixed to the lower rear cross-member 27 as for example by welding. The upwardly extending frame 30 also includes an upper cross-member 34 that is also fixed to an upper portion of the tubes 29 and 31 as for example by welding. This upper cross-member 34 also includes outer portions 33 and 35 that extend slightly outwardly beyond the tubes 29 and 31.

An upper C-shaped support member 38 and a lower C-shaped support member 40 are fixed to an upper portion of the tubular members 29 and 31 and a lower portion of tubular members 29 and 31 respectively. Means such as a knob and threaded stud 41 are threaded into an upper outer tubular member to clamp the upper portion or outer tube and lower portion or inner tube together to fix the distance between the upper C-shaped support member 38 and the lower C-shaped support member 40 at a selected height to provide appropriate spacing to accommodate gas cylinders of different sizes.

An upwardly extending extension 42 is fixed to an upper portion of the upwardly extending frame and specifically to the upper portion of the tubular members 29' and 31' by the upper cross member 34 and a mounting plate 63 that includes arc shaped or semi-circular ends 64 and 65 (see FIG. 4A) that are shaped to correspond or closely fit over the upper portions of pivotal members 29' and 31' and are welded thereto. The extension 42 may have a handle 44 at the distal end thereof and a hinge 45 or the like that allows the extension 42 to be folded over upon itself for storage or to be folded at up to about 90° for moving the cart to another location.

The support stand or cart 20 also includes a first flexible belt 50 and four guide members 52, 54, 56, and 58.

Assuming that the first flexible belt 50, is fixed to and starts with a central portion positioning member 60, the belt 50 proceeds upwardly and outwardly to the first guide member 52 fixed to a first outer extension 35 of the upper cross member 34 and then downward to the second guide member 54 at a first outer portion 37 of the lower rear cross member 26. From there, the belt 50 changes direction and moves upwardly and inwardly to the central positioning member 60. The belt 50 crosses over or through the central positioning member 60 and proceeds upwardly and outwardly towards the third guide member 56. From there, the belt 50 moves downwardly to the fourth guide member 58 on the second outer portion 39 of the lower rear cross member 26 and is redirected upwardly and inwardly to the central positioning member 60 and is fixed to an adjacent portion of the belt 50 or to the central positioning member 60 by a buckle or the like.

A second flexible belt 62 is fixed to and extends from the central positioning member 60 outwardly and around a gas cylinder (not shown) and is positioned centrally between the support members 38 and 40 to hold the gas cylinder securely against the support members 38 and 40.

Figure 4A:
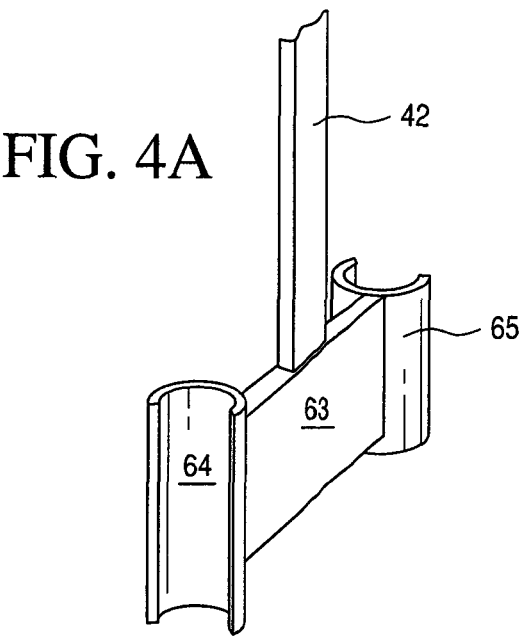
FIG. 4A is a perspective view of a portion of an extension for a handle as used in the present invention.

Referring now to FIG. 4A, the upper extension 42 in a preferred embodiment of the invention has a generally rectangular cross-section and is fixed to a mounting plate 63 as for example by welding. The plate 63 is also fixed to two arc shaped or semi-circular attachments or brackets 64 and 65 that are fixed to the upper outer tubular members 29' and 31' as for example by welding and is shown in FIGS. 4B and 4C.

Figure 4B:
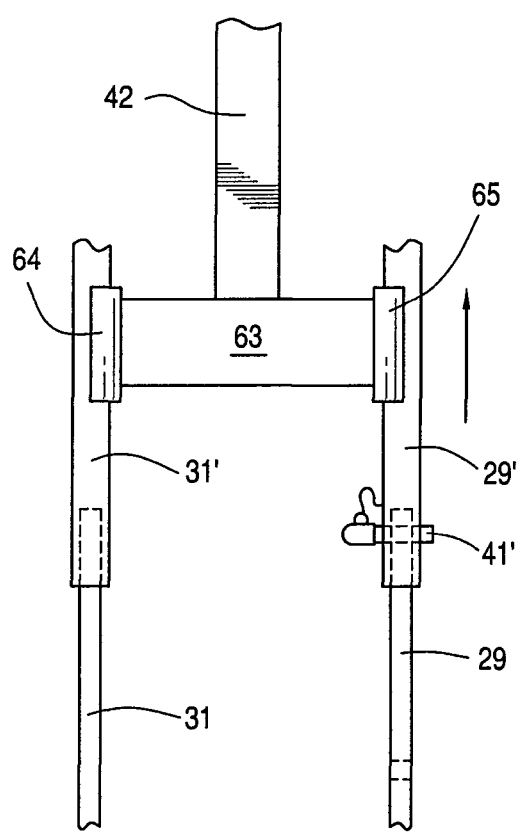
FIG. 4B is a front elevational view of a portion of an upper frame with upwardly extending telescoping tubes as used in the present invention.
Figure 4C:
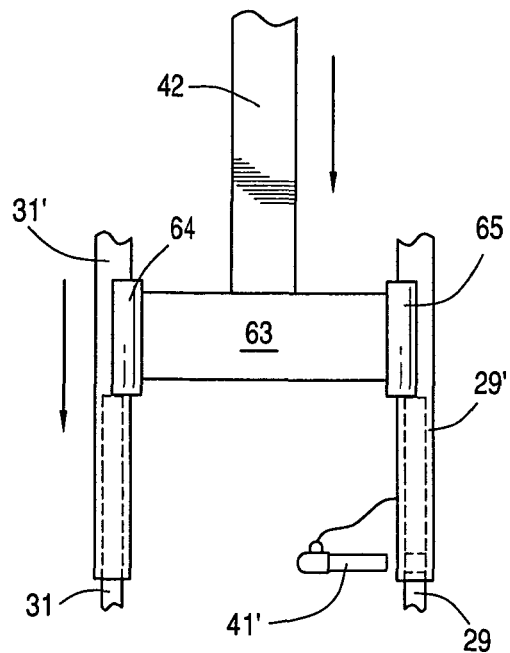
FIG. 4C is a front elevational view of the telescoping tubes and a locking pin as used in one embodiment of the present invention.

FIG. 4B illustrates the tubular members 29 and 31 and outer tubes 29' and 31' in an extended position with a pin 41 fixing the upper and lower tubes in an extended position. By contrast, FIG. 4C shows the tubular members 29 and 31 and upper tubes 29' and 31' in a compressed position and the pin 41 removed.

While the invention has been described in connection with its preferred embodiment it should be recognized that changes and modifications may be made therein without departing from the scope of the appended claims.

What is claimed is:

1. A stable stand or cart for a gas cylinder, said stand or cart comprising:

a T-shaped base assembly including a forwardly extending base member and a lower rear cross-member and said T-shaped base assembly having three outer portions, an upper surface and a lower surface;

three casters with one of said casters fixed to said lower surface of each of said three outer portions of said T-shaped based assembly;

an upwardly extending frame including a pair of upwardly extending spaced apart generally parallel telescoping tubes fixed to said lower rear cross-member of said T-shaped base assembly and an upper cross frame member having two outer extensions and said upper cross member fixing an upper end of said telescoping tube in a spaced generally parallel relationship and extending outwardly therefrom, and wherein said upper cross frame member is generally parallel with said lower rear cross member and includes two outwardly extending portions that extend outwardly from said upwardly extending telescoping tubes;

an upper and a lower C-shaped support member for supporting side portions and a back of a gas cylinder or cylinders fixed to said upwardly extending frame with said upper C-shaped support member fixed to an upper portion of said upwardly extending frame and said lower C-shaped support member fixed to a lower portion of said frame;

means for fixing said telescoping tubes at a pre-selected height to thereby space said C-shaped support members at a pre-selected distance;

an extension element extending upwardly above said upper C-shaped support member and fixed to said upwardly extending frame for moving said stand or cart and/or positioning said stand or cart at a pre-selected location; and a first flexible belt and four guide members with one of said guide members at each outer extension of said upper cross frame member and one at each outer portion of said lower rear cross-member and a central positioning member and a flexible belt extending through said four guide members and said central positioning member to connect four guide members and said central positioning member, and a second separate belt extending forwardly around a gas cylinder and means for fastening said second separate belt to hold the gas cylinder in place against said C-shaped support members.

2. A stable stand or cart for a gas cylinder according to claim 1 which includes a handle fixed to an upper end of said extension element.

3. A stable stand or cart for a gas cylinder according to claim 2 in which said extension element includes means for folding said extension element over upon itself.

4. A stable stand or cart for a gas cylinder according to claim 3 in which said T-shaped base assembly, said upwardly extending frame and said C-shaped support members are made of steel.

5. A stable stand or cart for a gas cylinder according to claim 3 in which said T-shaped base assembly, said upwardly extending frame and said C-shaped support members are made of aluminum.

6. A stable stand or cart for a gas cylinder according to claim 4 in which said belts are made of leather or nylon.

7. A stable stand or cart for a gas cylinder according to claim 5 in which said first belt extends from said central positioning member up through a first of said guide members on a first outer extension of said upper cross frame member down through said second of said four guide members below and aligned with said first of said four guide members up through said central positioning member to a third of said four guide members on said second outer extension of said upper cross frame member down through said fourth of said four guide members on said second outer portion of said lower rear cross-member and upward to said central positioning member and fixed to said belt to provide a continuous belt connecting said outer extension of said upper cross frame member with the outer portions of said lower rear cross-member with an inner X connected to or passing through said central positioning member.

8. A stable stand or cart for a gas cylinder, said stand or cart consisting of:

a steel T-shaped base assembly including a forwardly extending base member and a lower rear cross-member and said T-shaped base assembly having three outer portions, an upper surface and a lower surface;

three swiveable casters with one of said casters fixed to said lower surface of said three outer portions of said T-shaped base assembly;

an upwardly extending steel frame including a pair of upwardly extending spaced apart generally parallel telescoping tubes fixed to said lower rear cross member of said T-shaped base assembly and an upper cross frame member having two outer extensions fixed to said upper cross frame member fixing an upper end of said telescoping tube in a spaced generally parallel relationship and extending outwardly therefrom and generally parallel with said lower rear cross member;

an upper and a lower C-shaped support member for supporting side portions and a back portion of a gas cylinder fixed to said upwardly extending frame with said upper C-shaped support member fixed to an upper part of said upwardly extending frame and said lower C-shaped support member fixed to a lower portion of said frame;

means for fixing said telescoping tubes at a pre-selected height to thereby space said C-shaped support members at a pre-selected distance;

an extension element extending upwardly above said upper C-shaped support member and fixed to said upwardly extending tubes by a generally horizontal flat member for moving and positioning said stand or cart to a selected location and said extension element including a handle and means for folding said extension element over upon itself;

four guide members with one of said guide members at each end of said two extensions of said upper cross member and one at each outer portion of said lower rear cross member, a central positioning member and a first flexible leather belt extending through said forward guide members and said central positioning member and a second flexible leather belt extending through said central positioning member around a gas cylinder and means for fastening said second flexible leather belt to hold the gas cylinder in place against said C-shaped support members; and wherein said first leather belt extends from said central positioning member up through a first of said four guide members on a first outer extension of said upper cross frame member down through said second of said four guide members below and aligned with said first guide member up through said central positioning member to a third of said four guide members on said second outer extension of said upper cross frame member down through said forth of said guide members on said second outer portion of said lower rear cross member and upward to said central positioning member and fastened to said belt to connect said outer ends thereof to provide a continuous loop connecting said outer ends of said upper cross frame member with outer portions of said lower rear cross member with an inner X connected to or passing through said central positioning member.

* * * * *